(12) United States Patent
Ebiko et al.

(10) Patent No.: US 7,416,396 B2
(45) Date of Patent: Aug. 26, 2008

(54) TIRE FORMING MOLD AND PNEUMATIC TIRE PRODUCING METHOD USING THE SAME

(75) Inventors: Masahiro Ebiko, Hiratsuka (JP); Tomoyuki Matsumura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 0 days.

(21) Appl. No.: 11/715,848

(22) Filed: Mar. 9, 2007

(65) Prior Publication Data
US 2007/0154584 A1    Jul. 5, 2007

Related U.S. Application Data

(62) Division of application No. 10/991,144, filed on Nov. 18, 2004, now Pat. No. 7,234,927.

(30) Foreign Application Priority Data
Nov. 20, 2003   (JP)   ............... 2003-390196

(51) Int. Cl.
    *B29C 35/02* (2006.01)
(52) U.S. Cl. .................. 425/46; 264/326; 264/334
(58) Field of Classification Search .......... 425/46, 425/47; 264/326
    See application file for complete search history.

(56) References Cited

U.S. PATENT DOCUMENTS

| | | | |
|---|---|---|---|
| 2,297,017 A | 9/1942 | Overman | |
| 3,553,789 A | 1/1971 | Allitt | |
| 3,704,082 A | 11/1972 | Hottle | |
| 3,854,853 A | 12/1974 | Mirtain | |
| 4,013,390 A | 3/1977 | Moeller et al. | |
| 4,022,554 A | 5/1977 | MacMillan | |
| 4,035,119 A | 7/1977 | Beres et al. | |
| 4,181,482 A | 1/1980 | Grawey et al. | |
| 4,289,463 A | 9/1981 | Le Moullac | |
| 5,190,767 A | 3/1993 | Beres et al. | |
| 5,667,812 A | 9/1997 | Shimizu | |
| 5,676,980 A | 10/1997 | Gulka et al. | |
| 6,632,393 B2 | 10/2003 | Fike | |

FOREIGN PATENT DOCUMENTS

JP    2001-129831 A1    5/2001

*Primary Examiner*—James Mackey
(74) *Attorney, Agent, or Firm*—Greer, Burns & Crain, Ltd.

(57) ABSTRACT

Provided are a tire forming mold which enables damage on ribs and blocks of a tire to be effectively prevented when the tire is removed from the tire forming mold in spite of a simple structure thereof, and a pneumatic tire producing method using the same. The tire forming mold according to the present invention is a two-division type of tire forming mold, including a mold main body for forming one side of the tire, wherein the mold main body is provided with a movable part which constitutes a part of a tread forming surface in the direction of the circumference thereof while the tire forming mold is being closed, and which can be moved while the tire is being removed from the tire forming mold.

4 Claims, 5 Drawing Sheets ately, the present invention relates to a tire forming mold which

TIRE FORMING MOLD AND PNEUMATIC TIRE PRODUCING METHOD USING THE SAME

This application is a divisional Application of Ser. No. 10/991,144, filed Nov. 18, 2004, now U.S. Pat. No. 7,234,927, the entire contents being incorporated by reference. This application claims priority based on Japanese Patent Application No. 2003-390196, filed Nov. 20, 2003, the entirety of which is incorporated herein by reference.

BACKGROUND OF THE INVENTION

The present invention relates to a two-division type of tire forming mold and a pneumatic tire producing method using the two-division type of tire forming mold. More specifically, the present invention relates to a tire forming mold which prevents damages on a rib and a block effectively in spite of a simple structure thereof when the tire is removed from the tire forming mold, and to a pneumatic tire producing method using the tire forming mold.

A two-division type of tire forming mold has heretofore been used in a process of curing a tire. Such a two-division type of tire forming mold includes a molding surface for molding one side of the tire integrally, and has a simple structure. This has brought up an advantage that costs for related facilities are small. However, in the two-division type of tire forming mold, the tire needs to be separated from the mold in the direction of the tire axis in a state where groove forming ribs arranged on a tread forming surface engage with tread portions. For this reason, there may be a case where parts of the ribs and blocks are damaged while the tire is separated from the mold.

FIGS. 7(a) to 7(c) schematically show how to remove the tire from the two-division type of tire forming mold when the tire has been cured by use of the tire forming mold. FIG. 8 shows a state of the rib and block of the tire when the tire is removed from the tire forming mold. In FIG. 7(a), a mold division position X for dividing a lower half 21 and an upper half 22 of the tire forming mold is set at a position higher than the center line L of the tire T. After completion of curing, the upper half 22 of the tire forming mold is displaced upward to open the tire forming mold, as shown in FIG. 7(b). At this time, the tire T remains in the lower half 21 of the tire forming mold, since the mold division position X is set at a position higher than the center line L of the tire T. Subsequently, as shown in FIG. 7(c), the tire T is pushed up in the direction of the tire axis, thereby separating the tire T from the lower half 21 of the mold. Then, the tire T is transferred outward in the direction of the tire diameter. Here, it should be noted that groove forming ribs are formed on the tread forming surfaces respectively of the lower half 21 and the upper half 22 of the tire forming mold. For this reason, when the tire T is separated from the lower half 21 of the tire forming mold, ribs and blocks which have been formed in the tread portions of the tire T are deformed as shown in FIG. 8. The root portions of some of the ribs and blocks to which the largest stress is applied are ripped, and the ribs and blocks are damaged.

In order to prevent such damages on the ribs and blocks, it has been suggested that a plurality of sector molds for forming the tread portions are provided separately from the lower and upper halves of the tire forming mold, and that these sector molds are displaced outward in the direction of the tire diameter when the tire is removed from the tire forming mold (see Japanese Patent Laid-open Official Gazette No. 2001-129831, for example). However, the sectional type of tire forming mold using the sector molds has a disadvantage that the sectional type of tire forming mold increases costs for related facilities to a large extent.

As other measures, change in the tread compound and modification in the shape of the grooves have been proposed. However, in a case where the tread compound is changed and the shape of the grooves is modified, this makes it difficult to achieve performance required for the tire. In addition, processing application has been proposed. Such processing application includes the coating of the inner surface of the tire forming mold with silicone resin, and vapor deposition of fluororesin on the inner surface of the tire forming mold. However, these cases require maintenance services to be performed continuously, since the coated resins do not have sufficient endurance.

SUMMARY OF THE INVENTION

An object of the present invention is to provide a tire forming mold which can make it possible to prevent damages on a rib and a block effectively in spite of a simple structure thereof when the tire is removed from the tire forming mold. Another object of the present invention is to provide a pneumatic tire producing method using the tire forming mold.

A tire forming mold according to the present invention for achieving the aforementioned objectives is a two-division type of tire forming mold, which includes a mold main body for forming one side of a tire, characterized in that the mold main body is provided with a movable part which constitutes a part of a tread forming surface in the direction of the circumference thereof while the tire forming mold is being closed, and which can be moved while the tire is being removed from the tire forming mold.

According to the present invention, the mold main body is provided with the movable part, which constitutes a part of the tread forming surface in the direction of the circumference thereof while the tire forming mold is closed, and which can be moved while the tire is separated. For this reason, the tire is easy to be locally separated from the tire forming mold in the movable part. Consequently, this can prevent concentration of stress on the tread portion of the tire, which is caused due to a groove forming rib arranged on the tread forming surface. Accordingly, a rib and a block can be effectively prevented from being damaged when the tire is removed. In addition, the movable part may only constitute a part of the tread forming surface in the direction of the circumference thereof, and the movable part requires no special power. For this reason, the structure of the tire forming mold as a whole is simple. This enables an inexpensive tire forming mold to be provided, and enables costs for related facilities to be inhibited from increasing to a large extent.

In the present invention, it is preferable that the measurement of the movable part be one eighth to a half of the circumferential length of the tread forming surface. This makes it easy to separate the tire from the tire forming mold. In addition, while the tire forming mold is being closed, the movable part needs to be fixed to the mold main body. For this reason, the behavior of the movable part may be restricted by a tightening force of the other half of the tire forming mold, the other half being opposite to the movable part while the tire forming mold is being closed. For the same reason, it is preferable that a contact surface of the movable part with the mold main body, the contact surface extending in the direction of the tire diameter, be inclined in a way that the inner in the direction of the tire diameter a point on the contact surface is, the outer in the direction of the tire axis the point on the contact surface is.

As a structure by which the movable part is fitted to the mold main body, the followings can be adopted. First, the movable part can be mounted swingably around a rotating shaft orthogonal to the direction of the tire axis. In this case, the rotating shaft of the movable part may be arranged outward of a dividing position on the inner surface of the tire forming mold, where the mold main body and the movable part are divided, in the direction of the tire axis. Second, the movable part can be mounted slidably along an inclined surface which is inclined with respect to the direction of the tire axis. Third, the movable part can be mounted slidably along an inclined surface which is inclined with respect to the direction of the tire diameter. In any one of these cases, the movable part is displaced in a natural manner in response to the displacement of the tire.

According to the present invention, the pneumatic tire producing method is provided, by which the tire is cured by use of the aforementioned tire forming mold, and by which the cured tire is removed from the tire forming mold including the movable part.

DETAILED DESCRIPTION OF THE PREFERRED EMBODIMENTS

Detailed descriptions will be given of a configuration according to the present invention with reference to the accompanying drawings.

Figure 1:
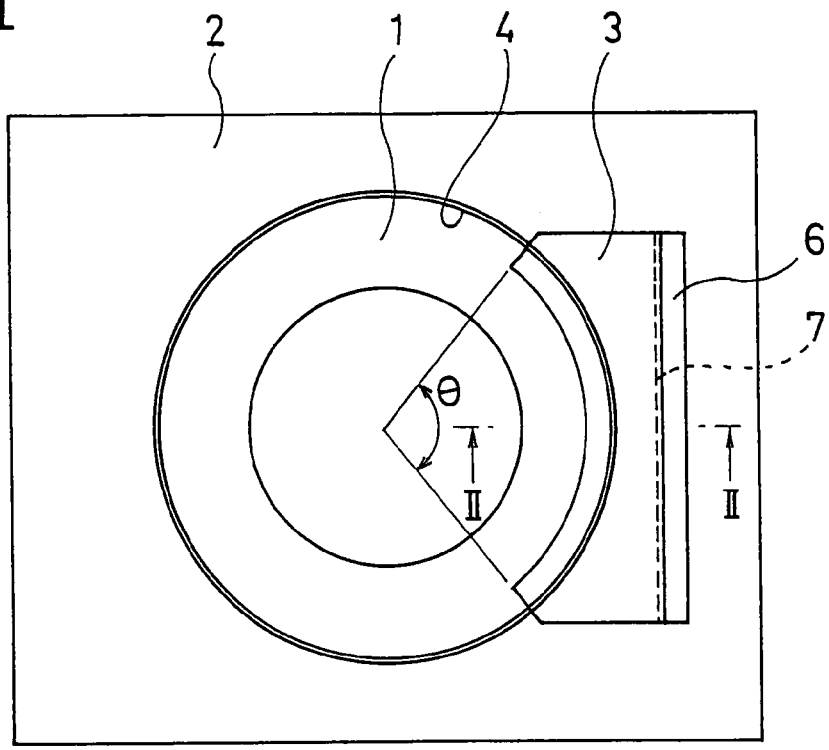
FIG. 1 is a plan view showing a tire forming mold according to a first embodiment of the present invention.
Figure 2:
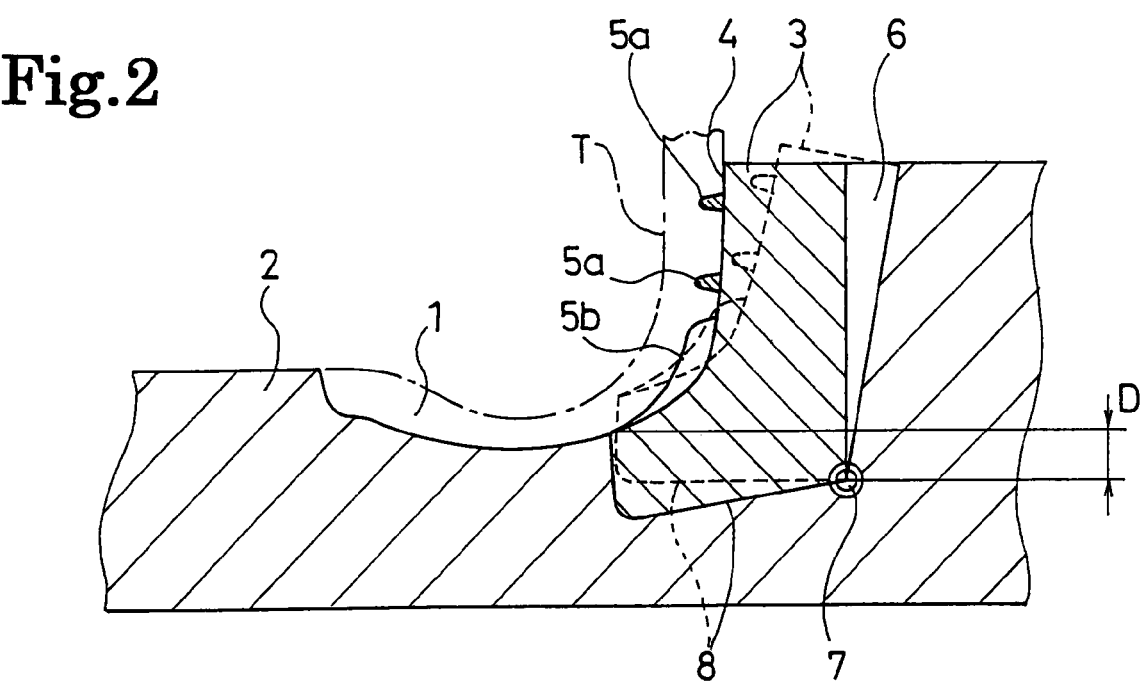
FIG. 2 is an end view shown in a cross-section taken along the line II-II of FIG. 1.

FIGS. 1 and 2 show a tire forming mold according to a first embodiment of the present invention. As shown in FIGS. 1 and 2, the tire forming mold according to the present embodiment has a structure in which a movable part 3 is provided in a mold main body 2 including a cavity 1 for forming one side of a tire from a bead portion to a tread portion in a integral manner. This movable part 3 is configured to constitute a part of a tread forming surface 4 in the direction of the circumference thereof while the tire forming mold is being closed, and is configured to behave independently of the mold main body 2 while the tire is being separated from the fire forming mold. In addition, the tread forming surface 4 is provided with a plurality of groove forming ribs 5a extending in the direction of the tire circumference and a plurality of groove forming ribs 5b extending in the direction of the tire width. These groove forming ribs 5a and 5b are formed on the movable part 3.

It is preferable that the measurement of the movable part 3 is set at one eighth to a half of the circumferential length of the tread forming surface 4. More preferably, the measurement of the movable part 3 is set at one third to a half of the circumferential length of the tread forming surface 4. In other words, as shown in FIG. 1, the movable part 3 is formed by an angle θ around the tire axis in a range of 45° to 180°, more preferably in a range of 120° to 180°. If the measurement of the movable part 3 is out of the aforementioned range, it is difficult to separate the tire T from the tire forming mold.

A structure in which the movable part 3 is fitted to the mold main body 2 is as follows. Specifically, the mold main body 2 includes a hollow portion 6 in a part of the tread forming surface 4 in the direction of the circumference thereof, the hollow portion 6 being one in which the movable part 3 is arranged. A rotating shaft 7 orthogonal to the direction of the tire axis is arranged pivotally in the hollow portion 6 of the mold main body 2. The movable part 3 is fitted swingably around this rotating shaft 7 in the hollow portion 6 of the mold main body 2. In addition, the movable part 3 is designed to be displaced freely without a power between a position (shown by a solid line) where the tire forming mold is closed and the other position (shown by a broken line) where the movable part 3 is positioned when the tire is separated from the tire forming mold.

In particular, it is suitable that the rotating shaft 7 of the movable part 3 be positioned outward of a dividing position on the inner surface of the tire forming mold, where the mold main body 2 and the movable part 3 are divided, in the direction of the tire axis. In FIG. 2, the rotating shaft 7 of the movable part 3 is arranged in a position away from the dividing position between the mold main body 2 and the movable part 3 by a distance D outward in the direction of the tire axis. In this point, it is suitable that the distance D be set at 10 to 40 mm. Thereby, the movable part 3 is easy to lean outward in the direction of the tire diameter by a force to be generated while the tire T is being removed from the tire forming mold.

The movable part 3 is formed so that it is flush with the mold main body 2 at the mold dividing position in a state where the tire forming mold is closed. For this reason, the behavior of the movable part 3 is restricted by a tightening force of the other half of the tire forming mold, the other half being opposite to the movable part 3 while the tire forming mold is being closed. In other words, the movable part 3 is fixed with respect to the mold main body 2 in a state where the tire forming mold is closed.

A contact surface 8 of the movable part 3 with the mold main body 2, the contact surface extending in the direction of the tire diameter, is inclined in a way that, the inner in the direction of the tire diameter a point on the contact surface is, the outer in the direction of the tire axis the point on the contact surface is. It is suitable that an angle of inclination of the contact surface 8 with respect to the direction of the tire diameter be 15° to 35°. In a case where the contact surface 8 of the movable part 3 is inclined in this manner, the movable part 3 is energized inward in the direction of the tire diameter when the movable part 3 receives a tightening force from the other half of the tire forming mold. Thereby, the movable part 3 is brought into close contact with the mold main body 2 without creating an interstice on the inner surface of the tire forming mold.

Next, a description will be given of a curing method in which the aforementioned tire forming mold (lower half of the tire forming mold) is used. First, a tire T which has not been cured yet is inserted in the cavity 1 of the mold main body 2. Thereafter, the tire T is covered with the other half of the tire forming mold (upper half of the tire forming mold), and the lower and upper halves of the tire forming mold are fastened together. At this time, the movable part 3 is fixed with respect to the mold main body 2 by the tightening force of the other half of the tire forming mold. Thereby, a state that the movable part 3 complements the tread forming surface 4 (shown by the solid line) is brought about. The other half of the tire forming mold is removed after completion of curing, and the tire T which has been cured is elevated. At this time, the movable part 3 is released from the tightening force which the movable part 3 has received from the other half of the tire forming mold, and the movable part 3 is in a movable state. For this reason, the movable part 3 swings around the rotating shaft 7 as the tire T is elevated upper. In other words, the tire T is easy to be locally separated from the lower half of the tire forming mold in the area of the movable part 3. As a result, this can prevent concentration of stress on the tread portion of the tire T, which is caused due to the groove forming ribs 5a and 5b arranged on the tread forming surface 4. Accordingly, the ribs and blocks of the tire can be effectively prevented from being damaged when the tire is removed.

Figure 3:
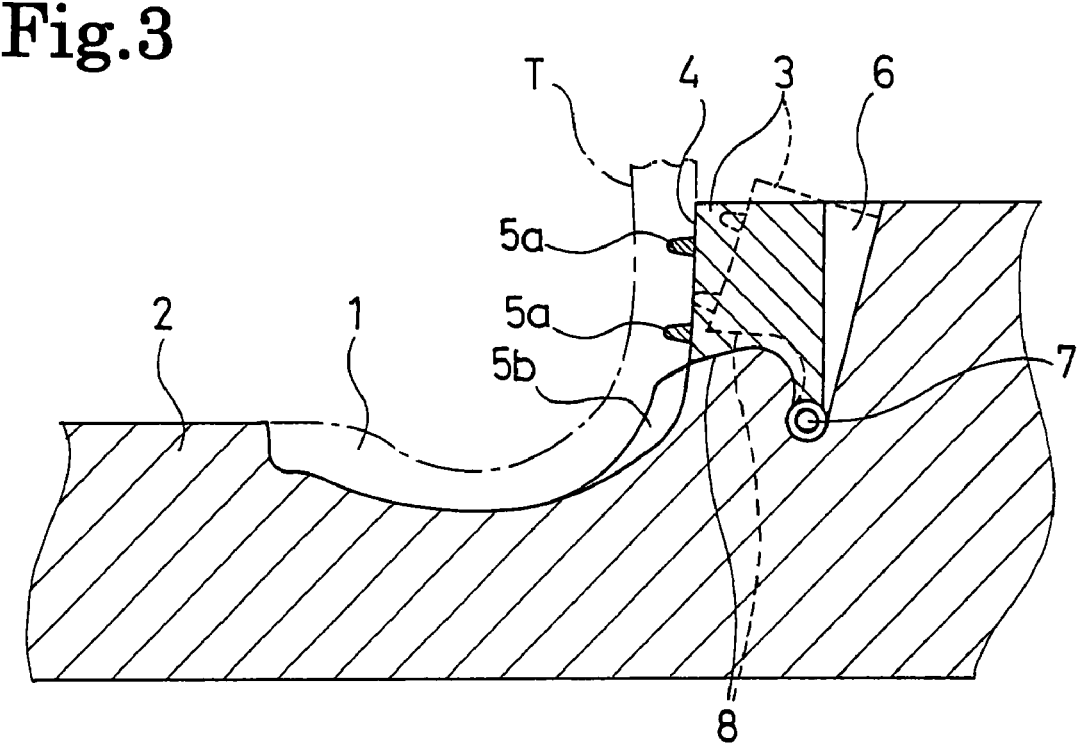
FIG. 3 is an end view showing a tire forming mold according to a second embodiment of the present invention, shown in a cross section corresponding to FIG. 2.

FIG. 3 shows a tire forming mold according to a second embodiment of the present invention. The present embodiment is carried out by modifying the structure by which the movable part is fitted to the mold main body. In FIG. 3, the same reference numerals are affixed to constituent components which are the same as those in FIGS. 1 and 2 and detailed descriptions for such constituent components will be omitted.

In FIG. 3, the structure by which the movable part 3 is fitted to the mold main body 2 is as follows. Specifically, the mold main body 2 includes the hollow portion 6 in a part of the tread forming surface 4 in the direction of the circumference thereof, the hollow portion 6 being one in which the movable part 3 is arranged. The rotating shaft 7 orthogonal to the direction of the tire axis is arranged pivotally in the hollow portion 6 of the mold main body 2. The movable part 3 is fitted swingably around this rotating shaft 7 in the hollow portion 6 of the mold main body 2. In addition, the movable part 3 is designed to be displaced freely without a power between a position (shown by a solid line) where the tire forming mold is closed and the other position (shown by a broken line) where the movable part 3 is positioned when the tire is separated from the tire forming mold. Incidentally, the plurality of groove forming ribs 5a extending in the direction of the tire circumference and the plurality of groove forming ribs 5b extending in the direction of the tire width are arranged in the tread forming surface 4. Out of those, the groove forming ribs 5a are formed in the movable part 3, and the groove forming ribs 5b are formed in the mold main body 2.

The present embodiment causes the groove forming ribs 5a extending in the direction of the tire circumference to belong to the movable part 3, and, on the other hand, causes the groove forming ribs 5b extending in the direction of the tire width to belong to the mold main body 2. However, the present embodiment can obtain the same operation and effect as the first embodiment does. Specifically, the groove forming ribs 5b extending in the direction of the tire width is less prone to become a cause of damage on the ribs and blocks. For this reason, the groove forming ribs 5b can be removed from the movable part 3.

Figure 4:
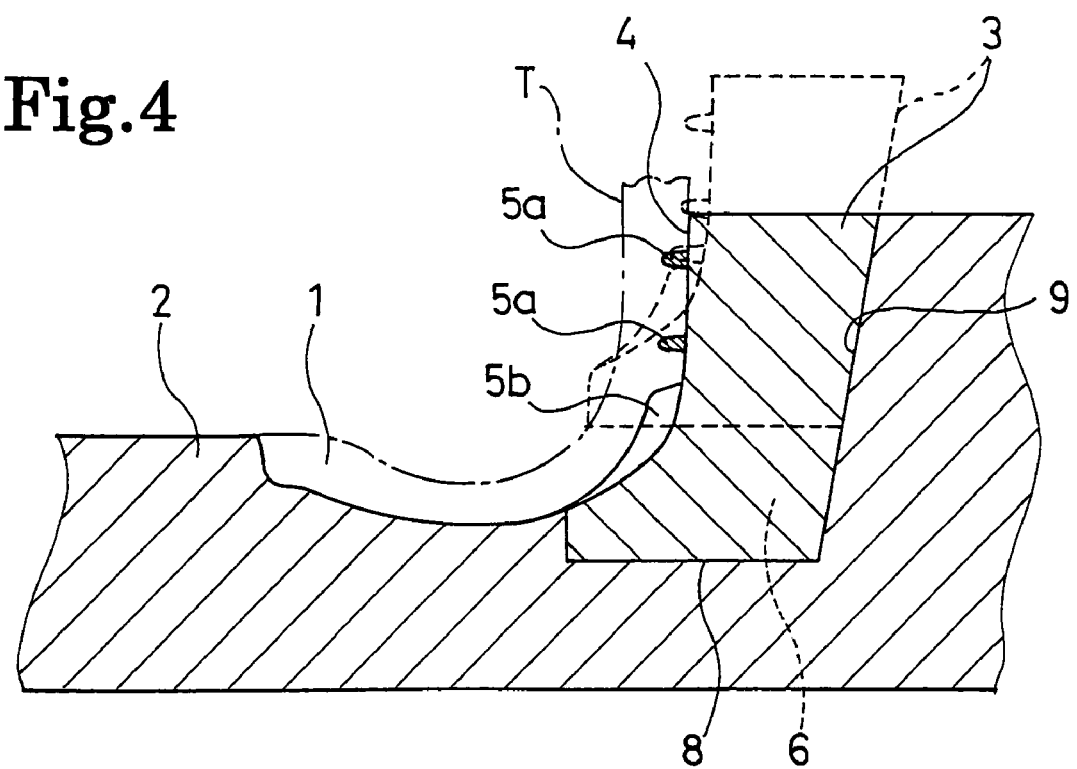
FIG. 4 is an end view showing a tire forming mold according to a third embodiment of the present invention, shown in a cross section corresponding to FIG. 2.

FIG. 4 shows a tire forming mold according to a third embodiment of the present invention. The present embodiment is carried out by modifying, in another manner, the structure by which the movable part is fitted to the mold main body. In FIG. 4, the same reference numerals are affixed to constituent components which are the same as those in FIGS. 1 and 2, and detailed descriptions for such constituent components will be omitted.

In FIG. 4, the structure by which the movable part 3 is fitted to the mold main body 2 is as follows. Specifically, the mold main body 2 includes the hollow portion 6 in a part of the tread forming surface 4 in the direction of the circumference thereof, the hollow portion 6 being one in which the movable part 3 is arranged. An inclined surface 9 which is inclined with respect to the direction of the tire axis is formed in the hollow portion 6 of the mold main body 2, and the movable part 3 is mounted slidably along the inclined surface 9 in the direction of the tire axis. For example, a dovetail groove can be processed in the inclined surface 9, and a projecting portion to engage with the dovetail groove can be provided in the movable part 3. In addition, the movable part 3 is designed to be displaced freely without a power between a position (shown by a solid line) where the tire forming mold is closed and the other position (shown by a broken line) where the movable part 3 is positioned when the tire is separated from the tire forming mold.

In the aforementioned tire forming mold, the movable part 3 is fixed with respect to the mold main body 2 by a tightening force of the other half of the tire forming mold while the tire forming mold is being closed. Thereby, a state that the movable part 3 complements the tread forming surface 4 (shown by the solid line) is brought about. The other half of the tire forming mold is removed after completion of curing, and the tire T which has been cured is elevated. At this time, the movable part 3 is released from the tightening force which the movable part 3 has received from the other half of the tire forming mold, and the movable part 3 is in a movable state. For this reason, the movable part 3 slides along the inclined surface 9 inward (upward in FIG. 4) in the direction of the tire axis as the tire T is elevated upper. In other words, the tire T is easy to be locally separated from the lower half of the tire forming mold in the area of the movable part 3. As a result, this can prevent concentration of stress on the tread portion of the tire T, which is caused due to groove forming ribs 5a and 5b arranged on the tread forming surface 4. Accordingly, the ribs and blocks can be effectively prevented from being damaged when the tire is removed.

Figure 5:
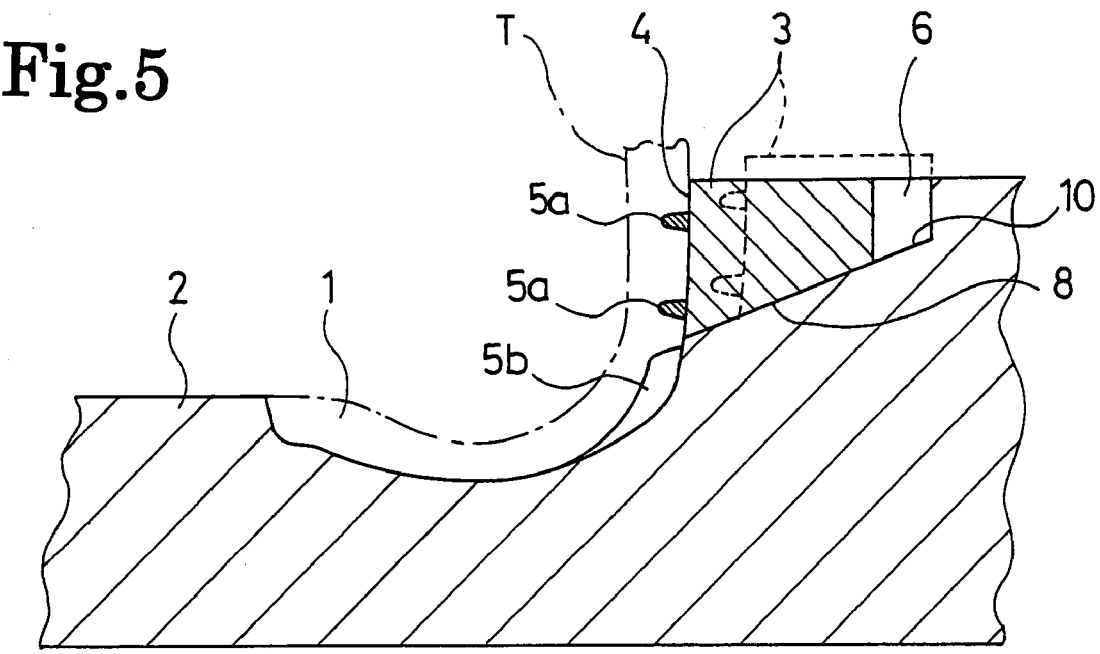
FIG. 5 is an end view showing a tire forming mold according to a fourth embodiment of the present invention, shown in a cross section corresponding to FIG. 2.

FIG. 5 shows a tire forming mold according to a fourth embodiment of the present invention. The present embodiment is carried out by modifying, in yet another manner, the structure by which the movable part is fitted to the mold main body. In FIG. 5, the same reference numerals are affixed to constituent components which are the same as those in FIGS. 1 and 2, and detailed descriptions for such constituent components will be omitted.

In FIG. 5, the structure by which the movable part 3 is fitted to the mold main body 2 is as follows. Specifically, the mold main body 2 includes the hollow portion 6 in a part of the tread forming surface 4 in the direction of the circumference thereof, the hollow portion 6 being one in which the movable part 3 is arranged. An inclined surface 10 which is inclined with respect to the direction of the tire diameter is formed in the hollow portion 6 of the mold main body 2, and the movable part 3 is mounted slidably along the inclined surface 10 in the direction of the tire diameter. For example, a dovetail groove can be processed in the inclined surface 10, and a projecting portion to engage with the dovetail groove can be provided in the movable part 3. In addition, the movable part 3 is designed to be displaced freely without a power between a position (shown by a solid line) where the tire forming mold is closed and the other position (shown by a broken line) where the movable part 3 is positioned when the tire is separated from the tire forming mold. Incidentally, the plurality of groove forming ribs 5a extending in the direction of the tire circumference and the plurality of groove forming ribs 5b extending in the direction of the tire width are arranged in the tread forming surface 4. Out of those, the groove forming ribs 5a are formed in the movable part 3, and the groove forming ribs 5b are formed in the mold main body 2.

In the aforementioned tire forming mold, the movable part 3 is fixed with respect to the mold main body 2 by a tightening force of the other half of the tire forming mold while the tire forming mold is being closed. Thereby, a state that the movable part 3 complements the tread forming surface 4 (shown by the solid line) is brought about. The other half of the tire forming mold is removed after completion of curing, and the tire T which has been cured is elevated. At this time, the movable part 3 is released from the tightening force which the movable part 3 has received from the other half of the tire forming mold, and the movable part 3 is in a movable state. For this reason, the movable part 3 slides along the inclined surface 10 outward in the direction of the tire diameter as the tire T is elevated upper. In other words, the tire T is easy to be locally separated from the lower half of the tire forming mold in the movable part 3. As a result, this can prevent concentration of stress on the tread portion of the tire T, which is caused due to groove forming ribs 5a and 5b arranged on the tread forming surface 4. Accordingly, the ribs and blocks can be effectively prevented from being damaged when the tire is removed.

Figure 6:
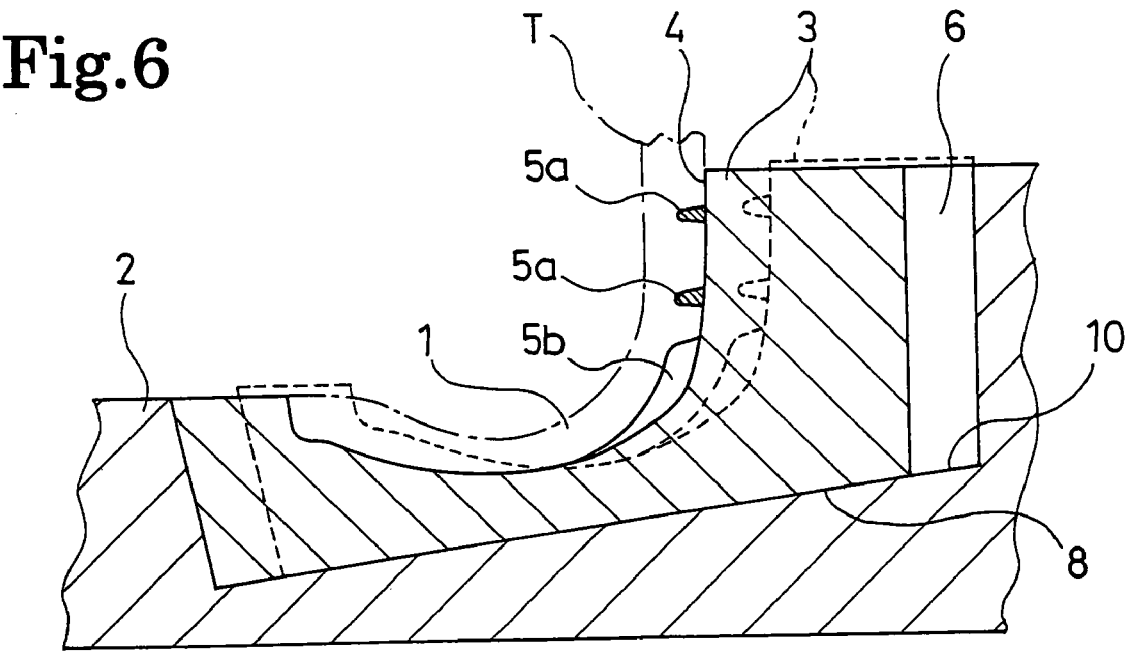
FIG. 6 is an end view showing a tire forming mold according to a fifth embodiment of the present invention, shown in a cross section corresponding to FIG. 2.
Figure 7A:
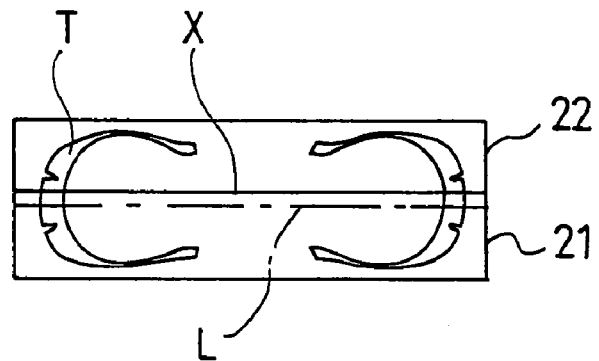
FIGS. 7(a) to 7(C) are schematic diagrams showing how to remove a tire from a conventional two-division type of tire forming mold in a case where the tire has been cured by use of the conventional two-division type of tire forming mold.
Figure 7B:
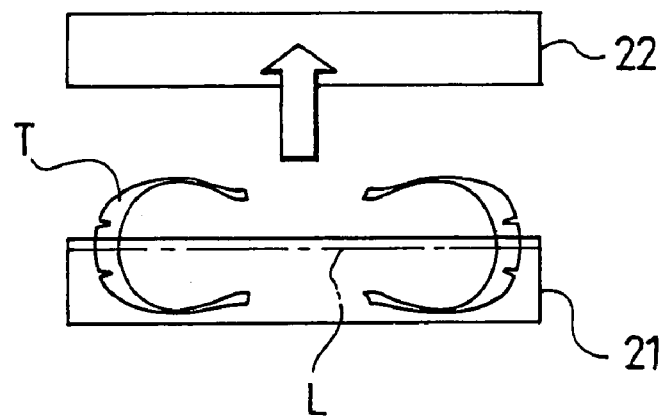
Figure 7C:
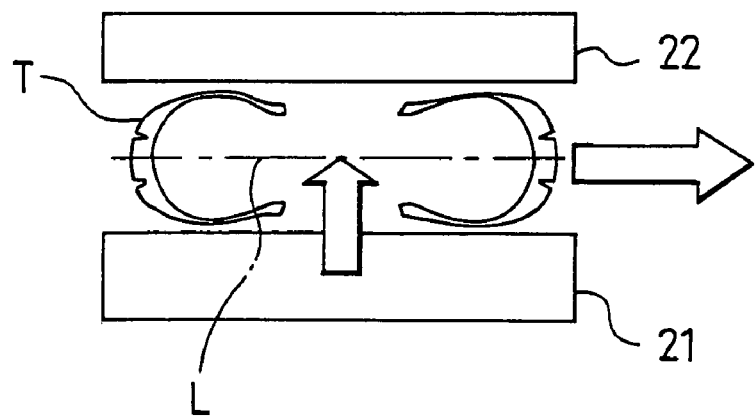
Figure 8:
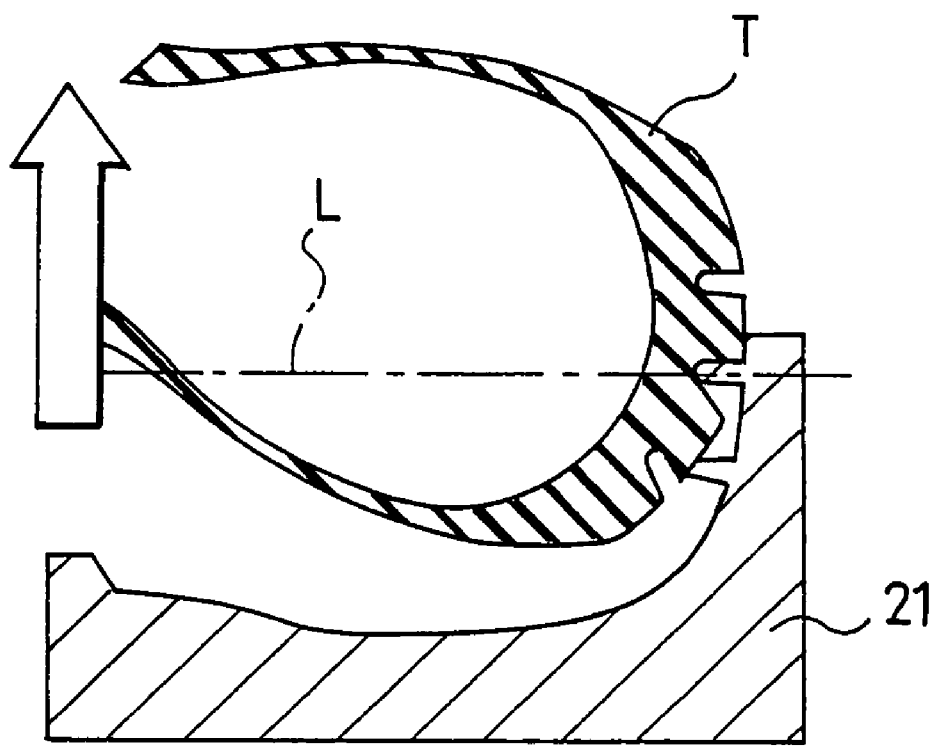
FIG. 8 is a cross-sectional view showing the state of a rib and a block of the tire when the tire is removed from the conventional two-division type of tire forming mold in a case where the tire has been cured by use of the conventional two-division type of tire forming mold.

FIG. 6 shows a tire forming mold according to a fifth embodiment of the present invention. The present embodiment is carried out by modifying, in still another manner, the structure by which the movable part is fitted to the mold main body. In FIG. 6, the same reference numerals are affixed to constituent components which are the same as those in FIGS. 1 and 2, and detailed descriptions for such constituent components will be omitted.

In FIG. 6, the structure by which the movable part 3 is fitted to the mold main body 2 is as follows. Specifically, the mold main body 2 includes the hollow portion 6 in a part of the tread forming surface 4 in the direction of the circumference thereof, the hollow portion 6 being one in which the movable part 3 is arranged. An inclined surface 10 which is inclined with respect to the direction of the tire diameter is formed in the hollow portion 6 of the mold main body 2, and the movable part 3 is mounted slidably along the inclined surface 10 in the direction of the tire diameter. For example, a dovetail groove can be processed in the inclined surface 10, and a projecting portion to engage with the dovetail groove can be provided in the movable part 3. In addition, the movable part 3 is designed to be displaced freely without a power between a position (shown by a solid line) where the tire forming mold is closed and the other position (shown by a broken line) where the movable part 3 is positioned when the tire is separated from the tire forming mold. Incidentally, the movable part 3 extends from the bead portion to the tread portion of the tire T.

In the aforementioned tire forming mold, the movable part 3 is fixed with respect to the mold main body 2 by a tightening force of the other half of the tire forming mold while the mold is being closed. Thereby, a state that the movable part 3 complements the tread forming surface 4 (shown by the solid line) is brought about. The other half of the tire forming mold is removed after completion of curing, and the tire T which has been cured is elevated. At this time, the movable part 3 is released from the tightening force which the movable part 3 has received from the other half of the tire forming mold, and the movable part 3 is in a movable state. For this reason, the movable part 3 slides along the inclined surface 10 outward in the direction of the tire diameter as the tire T is elevated upper. In other words, the tire T is easy to be locally separated from the lower half of the tire forming mold in the movable part 3. As a result, this can prevent concentration of stress on the tread portion of the tire T, which is caused due to groove forming ribs 5a and 5b arranged on the tread forming surface 4. Accordingly, the ribs and blocks can be effectively prevented from being damaged when the tire is removed.

With regard to the above described tire forming molds of the respective embodiments, only the movable part 3 constituting a part of the tread forming surface 4 in the direction of the circumference thereof is added to the mold main body 2 for forming most parts of one side of the tire T. Furthermore, a special power is not required. For these reasons, the structures of the respective tire forming molds as a whole are simple. This makes it possible to provide the tire forming mold which is inexpensive compared with the sectional type of tire forming mold, and this enables costs for related facilities to be inhibited from increasing. Since the aforementioned tire forming molds have a good releasability, it is a matter of course that the tread compound needs not be changed, a shape of the grooves needs not be modified, and the inner surface of the tire forming mold needs not be processed with resin.

Each of the aforementioned embodiments has been described by citing the example that the present invention is applied to the lower half of the two-division type of tire forming mold which is divided into the upper and lower halves. Instead, the present invention can be applied to the upper half or the like of the two-division type of tire forming mold which is divided into the upper and lower halves.

Detailed descriptions have been given above of the preferred embodiments of the present invention. It should be understood that various modifications, substitutions and replacements can be made as long as these modifications, substitutions and replacements do not depart from the spirit or scope of the present invention defined in the appended claims.

What is claimed is:

1. A tire forming mold, which is a two-division type of tire forming mold, comprising:
   a mold main body for forming one side of a tire, wherein the mold main body consists of a hollow portion, and
   a single, freely displaceable movable part set in the hollow portion, the movable part constituting a pan of a tread forming surface in the direction of the circumference thereof while the tire forming mold is being closed, and which can be moved while the tire is being removed from the tire forming mold, and
   wherein the movable part is mounted slidably along an inclined surface which is inclined with respect to the direction of the tire axis.

2. The tire forming mold according to claim 1, wherein the measurement of the movable part is one eighth to a half of the circumferential length of the tread forming surface.

3. The tire forming mold according to claim 1, wherein the behavior of the movable part is restricted by a tightening force of the other half of the tire forming mold which is opposite to the movable part while the tire forming mold is being closed.

4. A pneumatic tire producing method, wherein a tire is cured by use of the tire forming mold according to claim 1, and
the tire which has been cured is removed from the mold main body comprising the movable part.

* * * * *